(12) United States Patent
Kakuta et al.

(10) Patent No.: US 8,773,679 B2
(45) Date of Patent: Jul. 8, 2014

(54) IMAGE FORMING APPARATUS WITH A DOCUMENT CONVEYING UNIT CAPABLE OF EFFICIENTLY PERFORMING A DOCUMENT READING OPERATION

(71) Applicant: KYOCERA Document Solutions Inc., Osaka (JP)

(72) Inventors: Masayuki Kakuta, Osaka (JP); Takurou Murata, Osaka (JP)

(73) Assignee: Kyocera Document Solutions Inc. (JP)

( * ) Notice: Subject to any disclaimer, the term of this patent is extended or adjusted under 35 U.S.C. 154(b) by 90 days.

(21) Appl. No.: 13/670,517

(22) Filed: Nov. 7, 2012

(65) Prior Publication Data

US 2013/0114097 A1    May 9, 2013

(30) Foreign Application Priority Data

Nov. 9, 2011  (JP) .................................. 2011-245778
Nov. 9, 2011  (JP) .................................. 2011-245779

(51) Int. Cl.
*G06F 3/12*      (2006.01)
*H04N 1/04*     (2006.01)

(52) U.S. Cl.
USPC ........................................ 358/1.13; 358/498

(58) Field of Classification Search
USPC ............... 358/1.1, 1.9, 1.13, 1.14, 1.15, 1.18, 358/498; 271/3.01, 3.14, 3.15, 3.17, 8.1; 399/371
See application file for complete search history.

(56) References Cited

U.S. PATENT DOCUMENTS

| 5,280,899 | A | * | 1/1994 | Kida et al. .................... 271/10.1 |
| 2004/0178571 | A1 | * | 9/2004 | Ohama et al. ................. 271/272 |
| 2007/0211312 | A1 | * | 9/2007 | Tokutsu ......................... 358/498 |
| 2008/0158621 | A1 | * | 7/2008 | Hamada et al. ............... 358/498 |
| 2009/0051106 | A1 |  | 2/2009 | Hayano |
| 2012/0170086 | A1 | * | 7/2012 | Oshima ......................... 358/498 |

FOREIGN PATENT DOCUMENTS

JP    2009-49786    3/2009

* cited by examiner

*Primary Examiner* — Gabriel Garcia
(74) *Attorney, Agent, or Firm* — Gerald E. Hespos; Michael J. Porco; Matthew T. Hespos

(57) ABSTRACT

A control unit for controlling a document conveying operation stops the conveyance of a document by a document conveying unit if document(s) is/are placed on a placing portion, the document is being conveyed and an upper structure is not in a closing posture. Further, the control unit stops the conveyance of the document when the trailing end of the document being conveyed has not passed a document reading position and, on the other hand, causes the document to be discharged to a document discharging portion without stopping the conveyance of the document when the trailing end has passed the document reading position if no document is placed on the placing portion, the document is being conveyed and the upper structure is not in the closing posture.

4 Claims, 12 Drawing Sheets

IMAGE FORMING APPARATUS WITH A DOCUMENT CONVEYING UNIT CAPABLE OF EFFICIENTLY PERFORMING A DOCUMENT READING OPERATION

This application is based on Japanese Patent Application Serial No. 2011-245778 and Japanese Patent Application Serial No. 2011-245779 filed with the Japan Patent Office on Nov. 9, 2011, the contents of which are hereby incorporated by reference.

BACKGROUND

The present disclosure relates to an image forming apparatus provided with an apparatus main body and an upper structure which can be set in a closing posture for covering the upper surface of the apparatus main body and an opening posture for exposing the upper surface.

There is known an image forming apparatus provided with an apparatus main body for housing an image forming unit for forming an image on a sheet and an auto document feeder (upper structure) mounted on the apparatus main body openably and closably relative to the upper surface of the apparatus main body. The auto document feeder includes a document placing portion on which a document is to be placed and a document discharging portion. When the auto document feeder is in a reading posture (closing posture), a document placed on the document placing portion is fed to a document reading surface and then discharged to the document discharging portion.

In the image forming apparatus of this type, if the auto document feeder is opened and closed while a document is discharged to the document discharging portion by the auto document feeder, the document may depart from a conveyance path and may not be able to be normally read. Further, the opening and closing operation may cause the document to fall or be jammed. Thus, a detector for detecting the posture of the auto document feeder (posture detector) is provided. A control unit for controlling a document conveying operation performs a control for prohibiting the use of the auto document feeder when it is detected by this detector that the auto document feeder is not closed during the conveyance of the document by the auto document feeder.

However, in the image forming apparatus as described above, a user may open the auto document feeder early, trying to manually place another document on the document reading surface for image reading before the last document is discharged after the last document is read. In such a case, the use of the auto document feeder is prohibited and the last document is not discharged although there is no problem in a subsequent image forming operation since the reading of the document is already finished. Thus, the reading of another document has to be waited until the prohibition of the use of the auto document feeder is lifted, which may cause the user to feel annoyed.

An object of the present disclosure is to provide an image forming apparatus capable of efficiently performing a document reading operation.

SUMMARY

An image forming apparatus according to one aspect of the present disclosure includes an apparatus main body having an upper surface, an upper structure, a posture detector, a document passage detector and a control unit for controlling a document conveying operation.

The apparatus main body includes a reader for reading an image of a document at a predetermined reading position on the upper surface, and an image forming unit for forming an image on a sheet based on an image read by the reader. The upper structure can be set in a closing posture for covering the upper surface of the apparatus main body and an opening posture for exposing the upper surface. The upper structure includes a placing portion on which the document is to be placed, a document discharging portion to which the document having an image read by the reader is to be discharged, a document conveying unit which feeds documents placed on the placing portion one by one and conveying the documents to the document discharging portion via the reading position, and a document detector for detecting whether or not any document is placed on the placing portion. The posture detector detects the posture of the upper structure. The document passage detector detects that the trailing end of the document conveyed by the document conveying unit has passed the reading position.

The control unit stops the conveyance of the document by the document conveying unit if the placement of the document on the placing portion is detected by the document detector, the document is being conveyed by the document conveying unit and the closing posture is not detected by the posture detector. Further, the control unit stops the conveyance of the document by the document conveying unit when it is not detected by the document passage detector that the trailing end of the document being conveyed has passed the reading position and, on the other hand, causes the document being conveyed to be discharged to the document discharging portion without stopping the conveyance of the document by the document conveying unit when it is detected by the document passage detector that the trailing end of the document being conveyed has passed the reading position if it is detected by the document detector that no document is placed on the placing portion, the document is being conveyed by the document conveying unit and the closing posture is not detected by the posture detector.

These and other objects, features and advantages of the present disclosure will become more apparent upon reading the following detailed description along with the accompanying drawings.

DETAILED DESCRIPTION

First Embodiment

Figure 1:
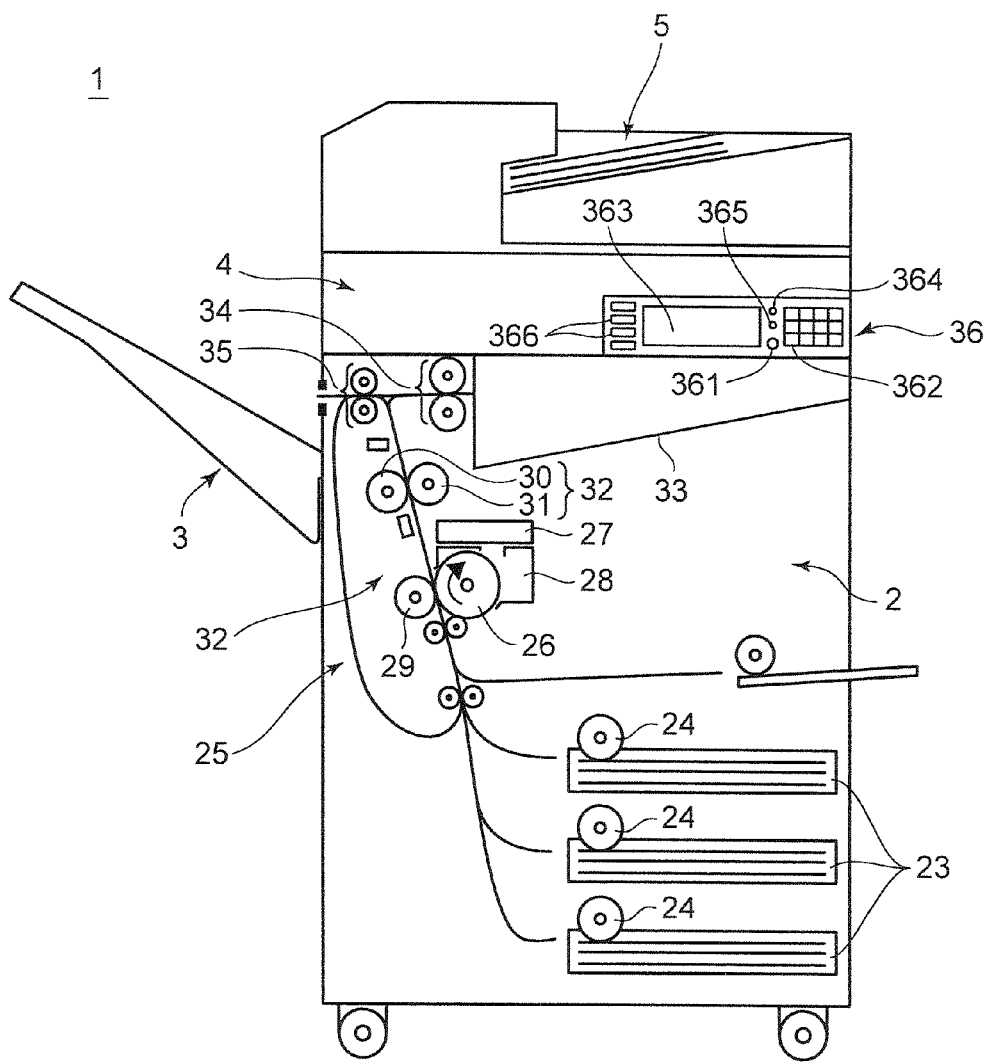
FIG. 1 is a schematic sectional view of a complex machine according to a first embodiment of an image forming apparatus according to the present disclosure.

Hereinafter, a complex machine as an embodiment of an image forming apparatus according to the present disclosure is described based on the drawings. FIG. 1 is a schematic sectional view of a complex machine 1 according to a first embodiment. The complex machine 1 has a plurality of functions of a copier, a printer, a scanner and the like, and includes a main assembly 2, a stack tray 3 arranged on the left side of the main assembly 2, an operation unit 36 used by a user to input various operation commands and the like, an image reader (reader) 4 arranged atop the main assembly 2, and a document feeder (upper structure) 5 arranged atop the image reader 4. An apparatus main body of the complex machine 1 includes the main assembly 2 and the image reader 4 and the upper surface of the image reader 4 is the upper surface of the apparatus main body. The document feeder 5 is rotatably mounted on the apparatus main body and can be set in a closing posture for covering the upper surface of the apparatus main body and an opening posture for exposing the upper surface.

The main assembly 2 includes a plurality of sheet cassettes 23, feed rollers 24 for feeding recording sheets one by one from the sheet cassettes 23 and conveying them to an image forming unit 25, and the image forming unit 25 for forming an image on a recording sheet conveyed from the sheet cassette 23.

The image forming unit 25 includes a photoconductive drum 26, an optical unit 27, a developing unit 28, a transfer unit 29, a fixing device 32 and pairs of conveyor rollers 34 and 35. The photoconductive drum 26 bears an electrostatic latent image and a toner image on the circumferential surface thereof. The optical unit 27 exposes the photoconductive drum 26 to light by outputting laser light based on an image signal obtained in the image reader 4 to be described later. The developing unit 28 supplies a toner to the photoconductive drum 26 and forms a toner image by developing the electrostatic latent image. The transfer unit 29 transfers the toner image on the photoconductive drum 26 to a recording sheet. The fixing device 32 includes a pair of rollers 30 and 31 for heating the recording sheet having the toner image transferred thereto and fixing the toner image to the recording sheet. The pairs of conveyor rollers 34 and 35 are provided on a sheet conveyance path in the image forming unit 25 and convey the recording sheet to the stack tray 3 or a discharge tray 33.

Note that, in the case of forming images on both sides of a recording sheet, the recording sheet is nipped between the pair of conveyor rollers 34 closer to the discharge tray 33 after an image is formed on one side of the recording sheet in the image forming unit 25. In this state, the pair of conveyor rollers 34 are rotated in reverse directions to switch back the recording sheet and the recording sheet is conveyed again to an upstream side of the image forming unit 25 along the sheet conveyance path. After an image is formed on the other side of the recording sheet in the image forming unit 25, this recording sheet is discharged to the stack tray 3 or the discharge tray 33.

The operation unit 36 includes a start key 361 used by a user to input a print instruction, a numerical keypad 362 used to input a number of prints to be made and the like, a display unit 363 configured to display operation guide information and the like for various copying operations and composed of a liquid crystal display or the like having a touch panel function used to input these various settings, a reset key 364 used to reset contents set on the display unit 363 and the like, a stop key 365 used to stop a printing (image forming) operation being performed, and function changeover keys 366 used to switch a copy function, a printer function, a scanner function and a facsimile function from one to another.

Figure 2:
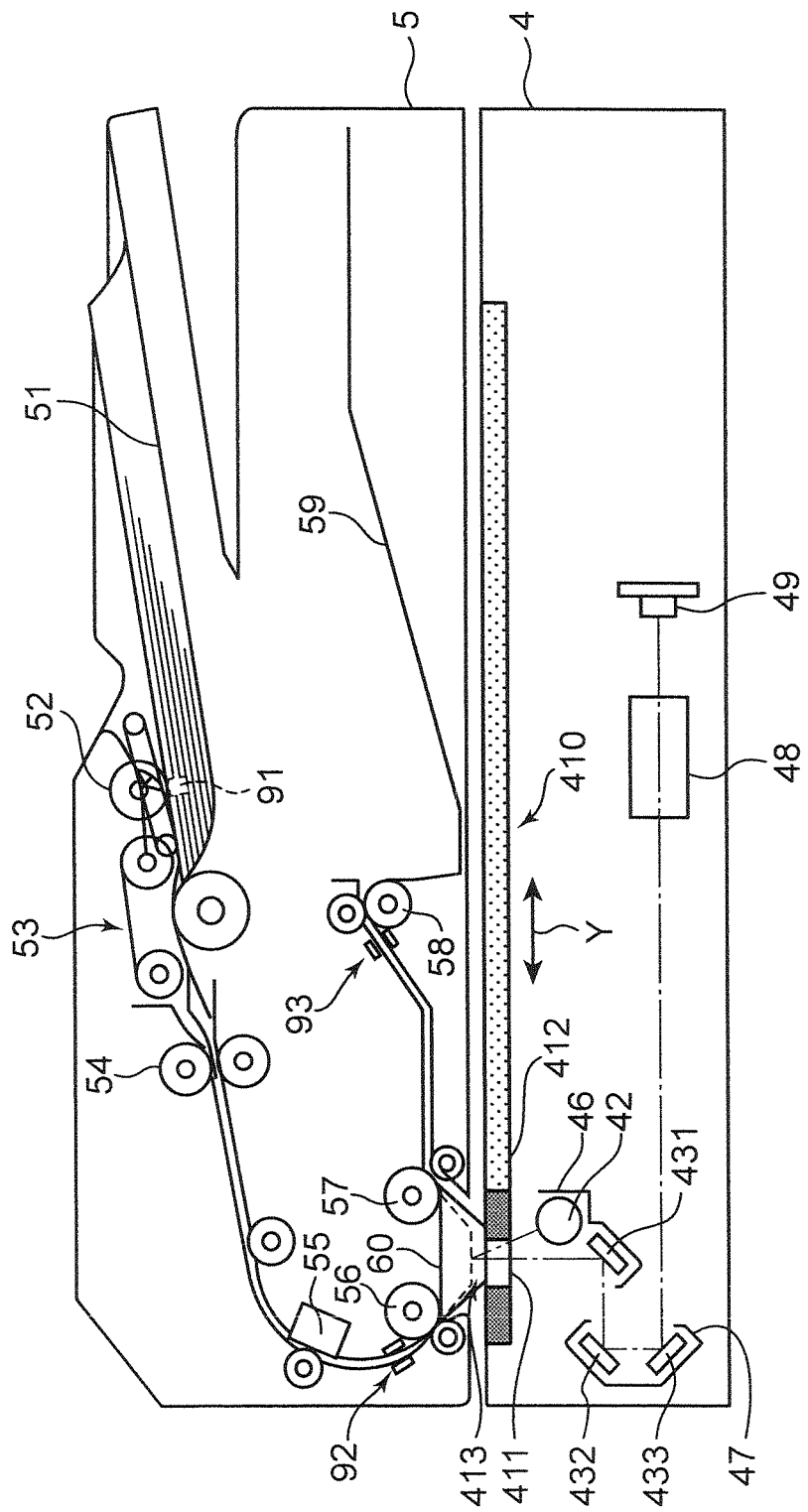
FIG. 2 is a schematic sectional view showing an upper structure according to the first embodiment of the present disclosure.

The image reader 4 optically obtains an image of a document and outputs an image signal. As shown in FIG. 2, the image reader 4 includes a contact glass 410, a light source 42, a first mirror 431, a second mirror 432, a third mirror 433, a first carriage 46, a second carriage 47, an imaging lens 48 and a CCD (Charge Coupled Device) 49. The light source 42 and the first mirror 431 are supported by the first carriage 46 and the second mirror 432 and the third mirror 433 are supported by the second carriage 47.

The contact glass 410 includes a wide document placing glass 412 and a long and narrow document automatic reading glass 411 to the left of the document placing glass 412. There are two types of methods for optically reading an image of a document by the image reader 4, i.e. a flat-bed reading mode for reading a document placed on the document placing glass 412 and an ADF reading mode for causing the document feeder 5 to convey a document and reading the document when the document passes a reading position 413 (predetermined reading position on the upper surface of the apparatus main body) corresponding to the document automatic reading glass 411.

Specifically, in the flat-bed reading mode, the light source 42 irradiates a document placed on the document placing glass 412 with light and reflected light from the document is reflected successively by the first mirror 431, the second mirror 432 and the third mirror 433 to be incident on the imaging lens 48. The light incident on the imaging lens 48 is imaged on a light receiving surface of the CCD 49 and output as an image signal through photoelectric conversion by CCD 49. After the reading of one line is finished, the first and second carriages 46, 47 are moved in a direction (sub scanning direction, direction of an arrow Y) orthogonal to a main scanning direction (direction perpendicular to the plane of FIG. 2) of the document and the next line is read.

On the other hand, in the ADF reading mode, when a document conveyed by the document feeder 5 passes the reading position 413, which is a clearance between the document automatic reading glass 411 and a reading guide 60, as described later, light is irradiated from the light source 42 to the document via the document automatic reading glass 411. Reflected light from the document is reflected successively by the first mirror 431, the second mirror 432 and the third mirror 433 to be incident on the imaging lens 48. The light incident on the imaging lens 48 is imaged on the light receiving surface of the CCD 49 and output as an image signal through photoelectric conversion by CCD 49. After the reading of one line is finished, the document is conveyed by the document feeder 5 and the next line is read.

The document feeder 5 is an ADF (Auto Document Feeder) and includes a document tray (placing portion) 51, a pickup roller (document conveying unit) 52, a separating roller (document conveying unit) 53, a registration roller (document conveying unit) 54, a CIS (contact Image Sensor) 55, a pre-reading roller (document conveying unit) 56, a post-reading roller (document conveying unit) 57, a discharge roller (document conveying unit) 58 and a discharge tray (document discharging portion) 59 as shown in FIG. 2. Further, a document detection sensor (document detector) 91, a read detection sensor (upstream detector) 92 and a discharge detection sensor (downstream detector) 93 are provided in the document feeder 5.

The document tray 51 is a tray on which one or more documents whose image(s) is/are to be optically read are placed. An unillustrated lifting mechanism for lifting the document(s) upward, for example, by moving a lift plate by an upward biasing force is provided on the bottom surface of the document tray 51. When documents are placed on the document tray, the lift plate is lifted upward by the lifting mechanism and the uppermost document comes into contact with the pickup roller 52.

The pickup roller 52 is in contact with the uppermost document of a stack of documents placed on the document tray 51 and feeds this document toward the separating roller 53. The separating roller 53 conveys documents fed from the pickup roller 52 one by one toward the registration roller 54. The registration roller 54 forms a nip in cooperation with a roller it is facing, and sends a document at an adjusted predetermined timing to the reading position 413 while correcting the oblique feed of the document by having the rotation and the stop thereof controlled.

The CIS 55 is a one-dimensional line sensor including a light emitting element and a light receiving element. The light emitting element emits light to the underside of a document being conveyed from the registration roller 54 to the reading position 43. The light receiving element receives and photo-electrically converts reflected light from the document surface, and outputs an image signal of one side of the document.

The reading guide 60 is arranged to face the document automatic reading glass 411 of the image reader 4 at a side downstream of the registration roller 54 in a document conveying direction and between the pre-reading roller 56 and the post-reading roller 57. This reading guide 60 is described in detail later based on FIG. 4.

The pre-reading roller 56 is provided upstream of the reading guide 60 in the document conveying direction, forms a nip in cooperation with a roller it is facing, and conveys a document toward the reading guide 60. When the document passes between this reading guide 60 and the document automatic reading glass 411, an image surface of the document (other side of the document) is read.

The post-reading roller 57 is arranged downstream of the reading guide 60 in the document conveying direction, forms a nip in cooperation with a roller it is facing, and conveys a document read at the reading position 413 toward the discharge tray 59. The discharge roller 58 is arranged downstream of the post-reading roller 57 in the document conveying direction, forms a nip in cooperation with a roller it is facing, and discharges the document read at the reading position 413 to the discharge tray 59.

The discharge tray 59 has a placing surface on which discharged documents are stacked. The placing surface is located below the discharge roller 58 near the discharge roller 58 and is inclined upward along a discharge direction. Note that, in this embodiment, the pickup roller 52, the separating roller 53, the registration roller 54, the pre-reading roller 56, the post-reading roller 57 and the discharge roller 58 described above constitute the document conveying unit for feeding the documents placed on the document tray 51 one by one and conveying the documents to the discharge tray 59 via the reading position 413.

The document detection sensor 91 is a sensor for detecting whether or not there is any document placed on the document tray 51 and disposed below and near the pickup roller 52. A light transmission type sensor including a light emitting element and a light receiving element on opposite side surfaces (opposite side surfaces perpendicular to the plane of FIG. 2) in the document feeder 5 can be, for example, used as the document detection sensor 91. When documents are placed on the document tray 51 and the uppermost document is in contact with the pickup roller 52, the document detection sensor 91 outputs a low-level detection signal indicating the presence of the documents from the light receiving element since light emitted from the light emitting element is blocked by the documents. On the other hand, when no document is placed on the document tray 51, light emitted from the light emitting element is received by the light receiving element. Thus, a high-level detection signal indicating the absence of the document is output from the light receiving element. Note that the document detection sensor 91 is not limited to the light transmission type sensor and may be a light reflection type sensor. Further, without being limited to these, the document detection sensor 91 may be a mechanical sensor, for example, for detecting the presence of a document by a downward movement of a projection biased upward such as by a spring provided on the bottom surface of the document tray 51 due to the contact with the document.

The read detection sensor 92 is disposed at a position (detection position) upstream of and near the pre-reading roller 56 in the document conveying direction and detects the presence of the document at this position. A photointerrupter in which a light emitter and a light receiver are facing each other with a document conveyance path therebetween can be, for example, used as the read detection sensor 92. The read detection sensor 92 outputs a high-level detection signal while light emitted from the light emitter toward the light receiver is not blocked and outputs a low-level detection signal while light emitted from the light emitter toward the light receiver is blocked by the document. That is, the detection signal output from the read detection sensor 92 is switched from high-level to low-level when the leading end of the document is conveyed to the read detection sensor 92, and switched from low-level to high-level when the trailing end of the document passes the read detection sensor 92 thereafter.

The discharge detection sensor 93 is disposed at a position (detection position) downstream of the reading position 413 and upstream of and near the discharge roller 58 in the document conveying direction, and detects the presence of the document at this position. A photointerrupter in which a light emitter and a light receiver are facing each other with the document conveyance path therebetween can be, for example, used as the discharge detection sensor 93. The discharge detection sensor 93 outputs a high-level detection signal while light emitted from the light emitter toward the light receiver is not blocked and outputs a low-level detection signal while light emitted from the light emitter toward the light receiver is blocked by the document being discharged. That is, the detection signal output from the discharge detection sensor 93 is switched from high-level to low-level when the leading end of the document is conveyed to the discharge detection sensor 93, and switched from low-level to high-level when the trailing end of the document passes the discharge detection sensor 93 thereafter.

Note that the read detection sensor 92 and the discharge detection sensor 93 are not limited to the photointerrupters and may be light reflection type sensors. Further, these sensors may be mechanical sensors, for example, for detecting the passage of a document based on the fact that a projection biased upward such as by a spring provided on the lower surface of the conveyance path moves upward after moving downward due to the contact with the document.

Figure 3:
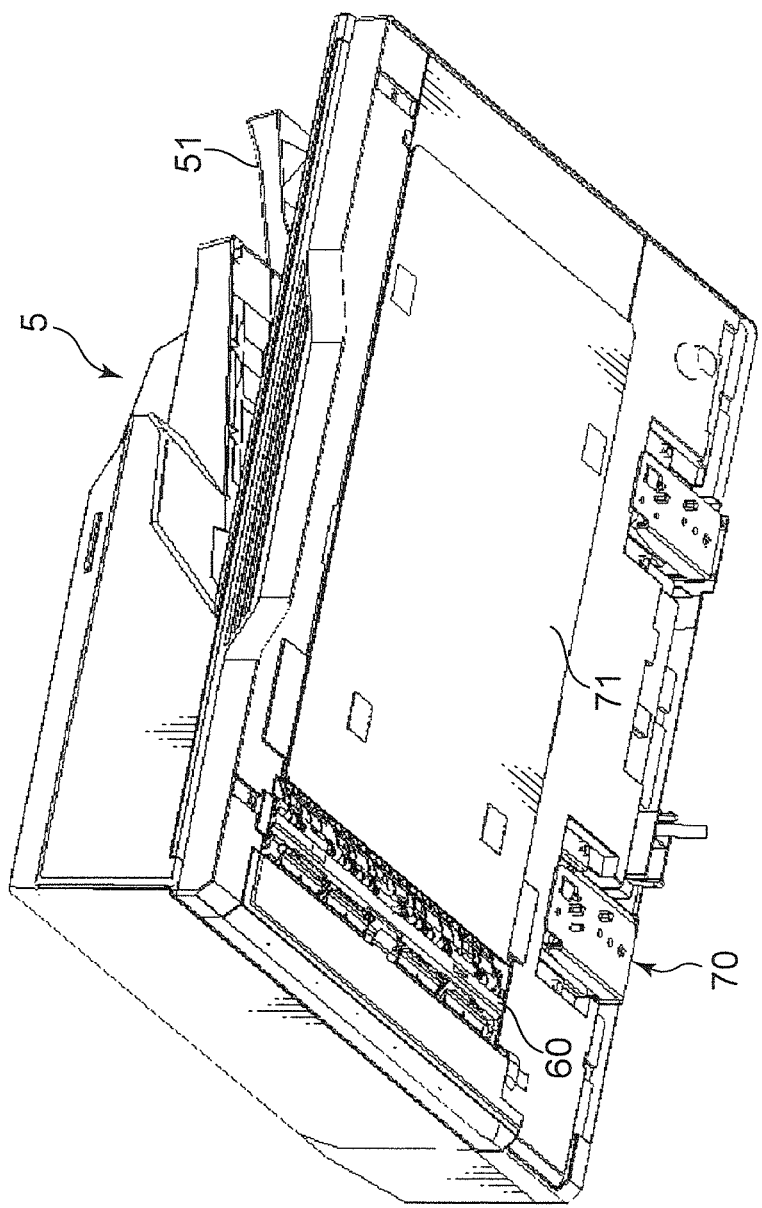
FIG. 3 is a perspective view of the upper structure shown in FIG. 2 when viewed from below.

The document feeder 5 also functions as a document presser for pressing the document placed on the document placing glass 412. As shown in FIG. 3, the document feeder 5 is supported rotatably relative to the apparatus main body (image reader 4) at hinge portions 70 arranged on the back side of the complex machine 1 (back sides of the planes of FIGS. 1 and 2). This enables the document feeder 5 to be set in the closing posture for covering the contact glass 410 and the opening posture for exposing the contact glass 410.

A pressing plate 71 is provided on the lower surface of the document feeder 5 and the document placing glass 412 faces the pressing plate 71. That is, the document feeder 5 is set in the closing posture, a document placed on the document placing glass 412 is pressed by the pressing plate 71 and the user operates the operation unit 36, whereby the image reader 4 can be caused to read an image surface of the document.

Figure 4:
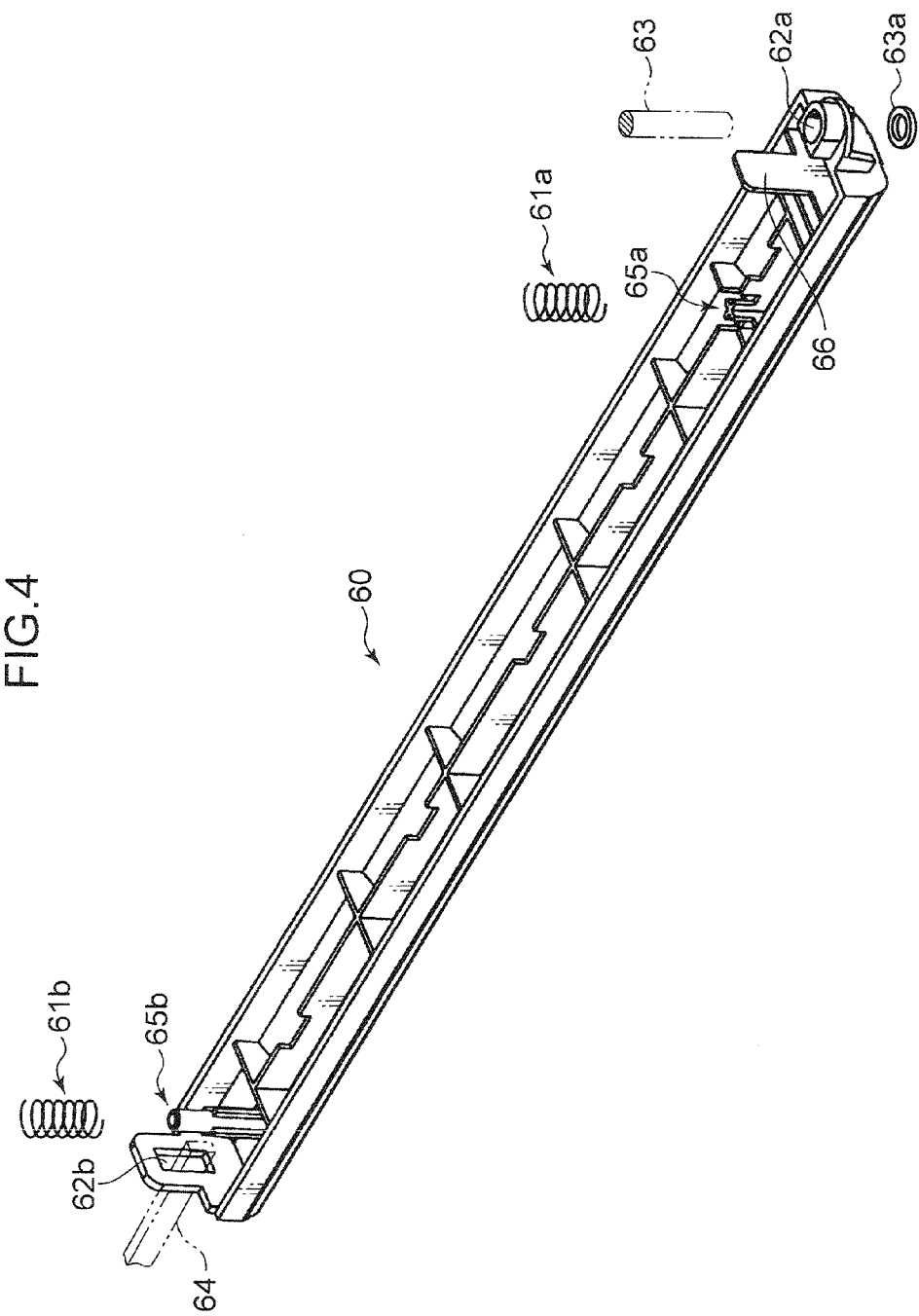
FIG. 4 is an exploded perspective view of a reading guide.

The reading guide 60 is a member long in a width direction (main scanning direction) of the document as shown in FIG. 4. The reading guide 60 is pressed toward the contact glass 410 by biasing forces of coil springs 61a, 61b provided on end parts of the reading guide 60 in a length direction. Note that one coil spring 61a is mounted on a mounting portion 65a provided at one longitudinal end side of the reading guide 60 and the other coil spring 61b is mounted on a mounting portion 65b provided at the other longitudinal end side of the reading guide 60.

The both longitudinal end parts (solid line part in FIG. 2) of the lower surface of the reading guide 60 project more downward than a central part (broken line part in FIG. 2). When the document feeder 5 is set in the closing posture, the both longitudinal end parts of the reading guide 60 are in contact with the contact glass 410 and a constant clearance is formed between the central part and the contact glass 410. The document passes through the clearance.

Guide holes 62a, 62b are provided on the both longitudinal ends of the reading guide 60. The guide hole 62a is arranged on the front side of the document feeder 5 and vertically penetrates through the reading guide 60 and a guide rod 63 fixed to the document feeder 5 and long in the vertical direction is inserted thereinto. For example, the upper end of this guide rod 63 is fixed to the document feeder 5, and an annular detachment preventing member 63a is mounted on the lower end side of the guide rod 63 below the guide hole 62a. That is, the front side of the reading guide 60 is vertically movable along the guide rod 63.

On the other hand, the guide hole 62b is arranged on the rear side of the document feeder 5, penetrates a side plate of the reading guide 60 in forward and backward directions and is formed to be long in the vertical direction, and a guide piece 64 horizontally projecting from the document feeder 5 is inserted thereinto. That is, the rear side of the reading guide 60 is vertically movable along the guide piece 64. By this, the reading guide 60 is made entirely movable in the vertical direction and moves toward and away from the contact glass 410.

Figure 5:
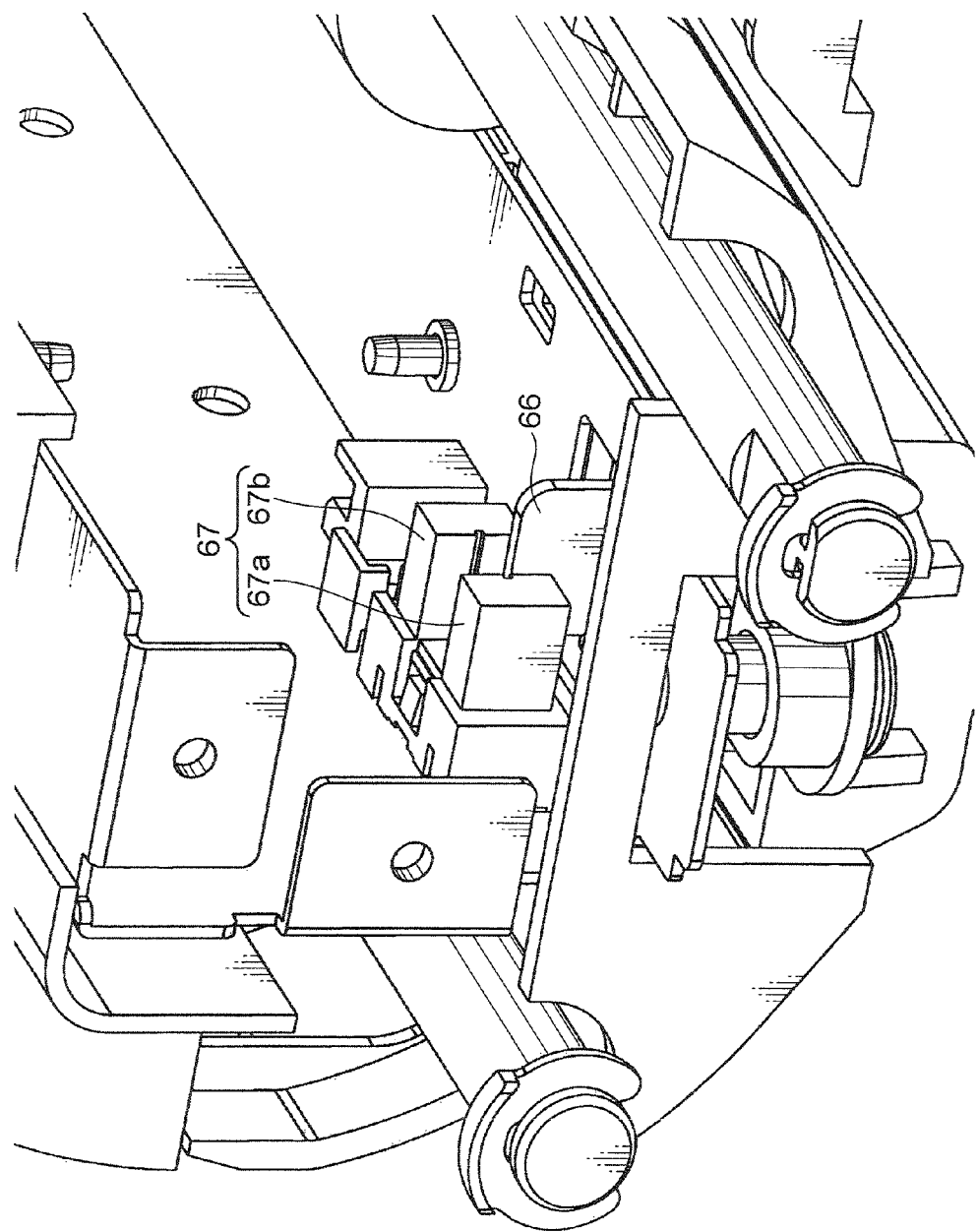
FIG. 5 is a perspective view of an example of a posture detector showing a state where the upper structure is in an opening posture.
Figure 6:
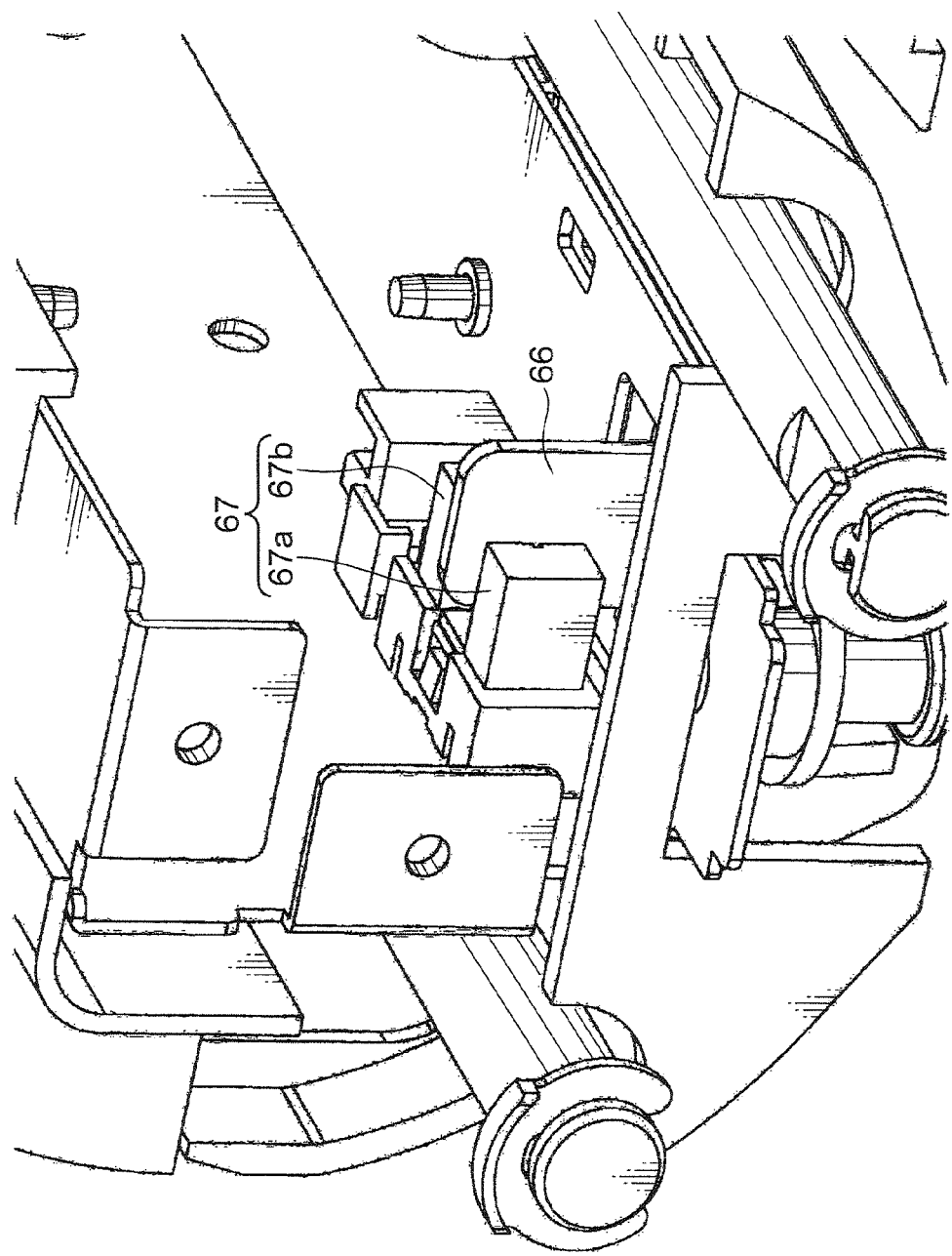
FIG. 6 is a perspective view of the posture detector showing a state where the upper structure is in a closing posture.

A plate-like light blocking member 66 projecting upward is provided near the front end of the reading guide 60. The light blocking member 66 has a predetermined height. FIGS. 5 and 6 are perspective views showing an open/close detection sensor 67 (posture detector) provided near the light blocking member 66. Note that FIG. 5 shows a state where the document feeder 5 is in the opening posture and FIG. 6 shows a state where the document feeder 5 is in the closing posture.

The open/close detection sensor 67 detects whether the document feeder 5 is in the opening posture to be opened relative to the upper surface of the apparatus main body or in the closing posture to be closed relative to this upper surface. The open/close detection sensor 67 is configured by a light transmission type sensor in which a light emitting element 67a and a light receiving element 67b face each other via the light blocking member 66. When light emitted from the light emitting element 67a is received by the light receiving element 67b as shown in FIG. 5, the open/close detection sensor 67 outputs a high-level detection signal indicating that the document feeder 5 is in the opening posture. On the other hand, when light which is supposed to be received by the light receiving element 67b is blocked by the light blocking member 66 as shown in FIG. 6, the open/close detection sensor 67 outputs a low-level detection signal indicating that the document feeder 5 is in the closing posture from the light receiving element 67b. Note that the open/close detection sensor 67 is not limited to this and may be configured by a light reflection type sensor.

Figure 7:
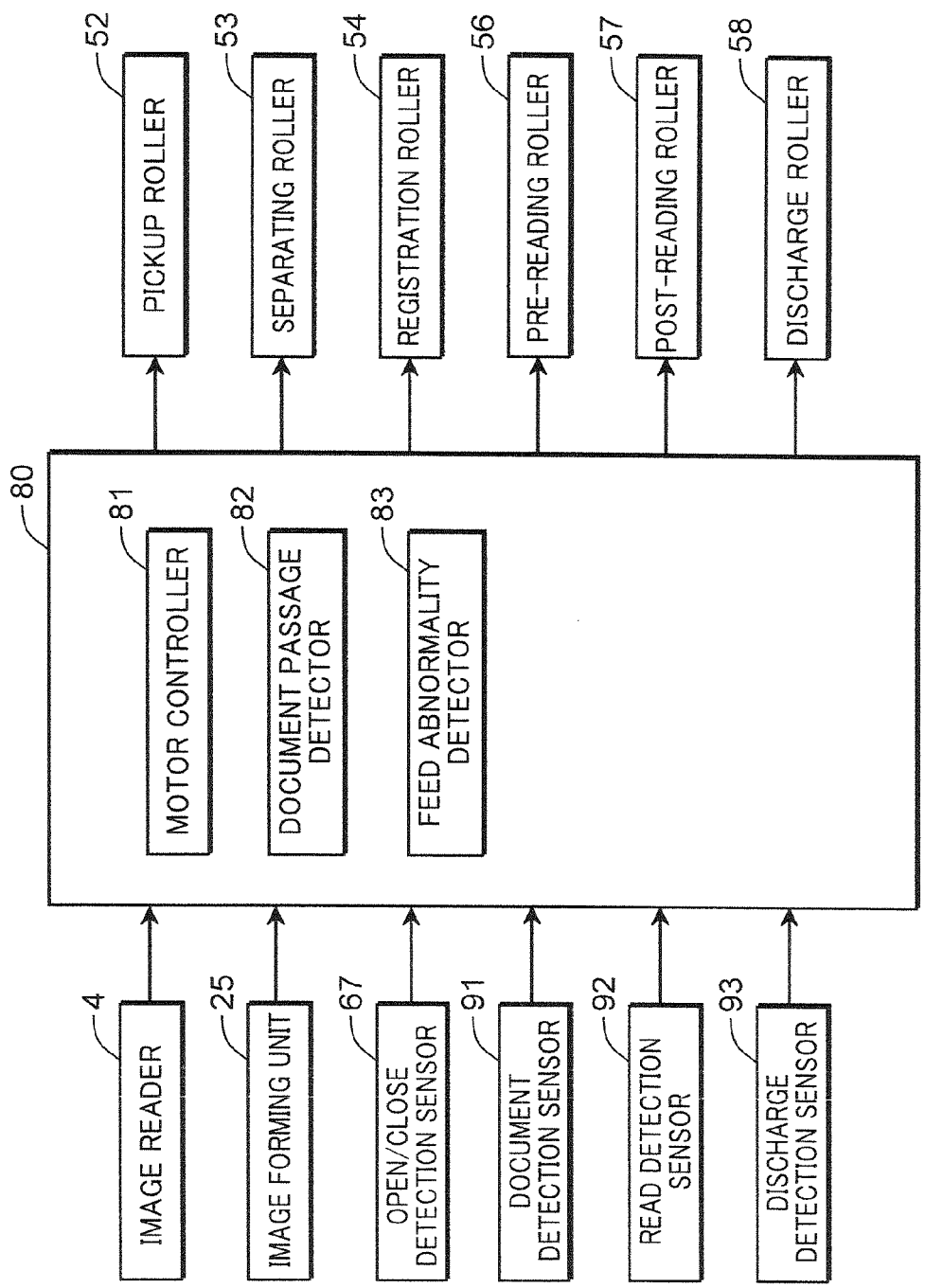
FIG. 7 is a block diagram showing an electrical configuration of the complex machine according to the first embodiment.

Next, an electrical configuration of the complex machine 1 is described using FIG. 7. The complex machine 1 includes a controller 80 responsible for an operation control of each unit of the complex machine 1. The controller 80 is, for example, configured by a microcomputer including a CPU and memories such as a ROM and a RAM and controls the operation of each unit by executing various control programs stored in the memory by the CPU.

The controller 80 is connected to be capable of mutual communication with the image reader 4, the image forming unit 25, various detection sensors 67, 91, 92 and 93 and drivers for various rollers 52, 53, 54, 56, 57 and 58 described above.

The controller 80 controls a document feeding operation of the document feeder 5 by executing a control program, which functions as a motor controller 81, a document passage detector 82 and a feed abnormality detector (control unit) 83, by the CPU.

The motor controller 81 outputs drive signals to unillustrated respective motors (the drivers) for driving and rotating the various rollers 52, 53, 54, 56, 57 and 58 about their shafts, and controls to drive and rotate the various rollers 52, 53, 54, 56, 57 and 58 at speeds predetermined therefor. Note that each motor is, for example, configured by a stepping motor and driven and rotated by a predetermined angle according to the pulse number of the drive signal.

The document passage detector 82 detects that the trailing end of a document being conveyed via the various rollers 52, 53, 54, 56, 57 and 58 has passed the reading position 413. Specifically, the document passage detector 82 determines that the document has passed the reading position 413 when the pulse number of the drive signal for the motor for driving the pre-reading roller 56 reaches a predetermined pulse number after a detection signal output from the read detection sensor 92 changes from a low-level signal indicating the presence of the document to a high-level signal indicating the absence of the document.

Note that the predetermined pulse number is determined based on an experimental value of a test operation or the like. For example, a document is conveyed a distance from a position where the read detection sensor 92 is arranged (detection position) to the reading position 413 and a pulse number equal to or larger than the pulse number of the drive signal required for the rotation of the motor for driving the pre-reading roller 56 at this time is determined as the predetermined pulse number.

The feed abnormality detector 83 controls to stop the driving rotation of the various rollers 52, 53, 54, 56, 57 and 58 and stop the conveyance of the document when the placement of the document on the document tray 51 is detected by the document detection sensor 91 and the closing posture of the document feeder 5 is not detected by the open/close detection sensor 67 during the conveyance of the document.

Further, the feed abnormality detector 83 controls to stop the driving rotation of the various rollers 52, 53, 54, 56, 57 and 58 and stop the conveyance of the document when it is not detected by the document passage detector 82 that the trailing end of the document has passed the reading position 413 if it is detected by the document detection sensor 91 that no document is placed on the document tray 51 and the closing posture of the document feeder 5 is not detected by the open/close detection sensor 67 during the conveyance of the document.

On the other hand, the feed abnormality detector 83 causes the document being conveyed to be discharged to the discharge tray 59 without stopping the driving rotation of the various rollers 52, 53, 54, 56, 57 and 58 when it is detected by the document passage detector 82 that the trailing end of the document has passed the reading position 413 if it is detected by the document detection sensor 91 that no document is placed on the document tray 51 and the closing posture of the document feeder 5 is not detected by the open/close detection sensor 67 during the conveyance of the document.

Figure 8:
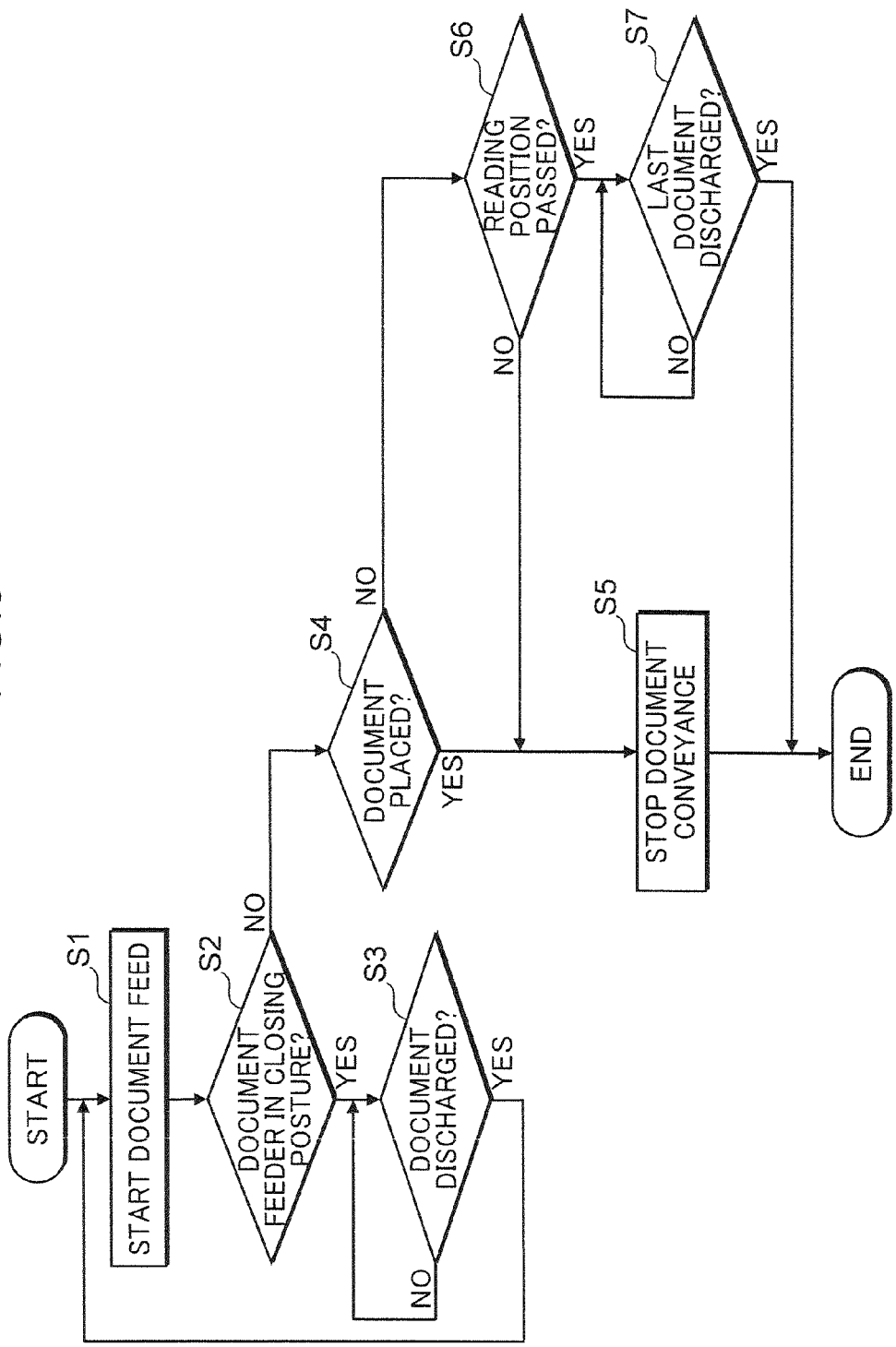
FIG. 8 is a flow chart showing an example of a document feeding operation of the upper structure according to the first embodiment.

The flow of the document feeding operation using the document feeder 5 is described below using a flow chart of FIG. 8.

When a document reading operation in the ADF reading mode is started by the controller 80, for example, based on a copy function execution instruction input from the operation unit 36, the motor controller 81 starts the drive of the drive motors for the various rollers 52, 53, 54, 56, 57 and 58 and starts the feed of the uppermost document of a stack of documents placed on the document tray 51 (S1).

The feed abnormality detector 83 continues the conveyance of the document by the various rollers 52, 53, 54, 56, 57 and 58 until the discharge of the document being conveyed to the discharge tray 59 is detected by the switch of a detection signal output from the discharge detection sensor 93 from low-level to high-level, i.e. the passage of the trailing end of the document through the discharge detection sensor 93 (S3; NO) if the low-level detection signal indicating that the document feeder 5 is in the closing posture is output from the open/close detection sensor 67 during the conveyance of the document by the various rollers 52, 53, 54, 56, 57 and 58 (S2; YES). If the document being conveyed is discharged to the discharge tray 59 (S3; YES), a return is made to Step S1 and the feed of the next document, i.e. the uppermost document on the document tray 51 is started.

On the other hand, if a high-level detection signal indicating that the document feeder 5 is in the opening posture is output from the open/close detection sensor 67 during the conveyance of the document (S2; NO), the feed abnormality detector causes the document detection sensor 91 to detect whether or not there is any document on the document tray 51 (S4).

If there is/are any document(s) on the document tray 51 and the low-level detection signal indicating the presence of the document is detected by the document detection sensor 91, i.e. the document that is not the last document is being conveyed (S4; YES), the feed abnormality detector 83 instructs the motor controller 81 to stop the drive motors for the various rollers 52, 53, 54, 56, 57 and 58, thereby stopping the conveyance of the document (S5). Note that the feed abnormality detector 83 may be configured to notify a reason, why the conveyance of the document has been stopped, to the user, for example, through the display of a message to the effect that the document feeder 5 was opened during the conveyance of the document on the display unit 363 in accordance with the execution of Step S5.

Further, the feed abnormality detector 83 also executes Step S5 if there is no document on the document tray 51 and the high-level detection signal indicating the absence of the document by the document detection sensor 91 is output, i.e. the last document is being conveyed (S4; NO) and if the passage of the document through the reading position 413 has not been detected by the document passage detector 82 after the conveyance of the last document is started (S6; NO).

Note that, in Step 6, the feed abnormality detector 83 may be configured to execute Step S5 and notify a need to re-read the last document to the user, for example, through the display of a message to the effect that the last document needs to be re-read due to the opening of the document feeder 5 during the reading of the last document on the display unit 363 if it is not detected by the document passage detector 82 that the document has passed the reading position 413.

On the other hand, the conveyance of the last document is continued if the high-level detection signal indicating the absence of the document is output by the document detection sensor 91, i.e. the last document is being conveyed (S4; NO) and if the passage of the document through the reading position 413 is detected by the document passage detector 82 (S6; YES) after the conveyance of the last document is started. Specifically, in this case, the feed abnormality detector 83 causes the various rollers 52, 53, 54, 56, 57 and 58 to continue the conveyance of the document until the last document being conveyed passes the discharge roller 58 and the discharge thereof to the discharge tray 59 is detected (S7; NO) after the elapse of a predetermined time after the switch of the detection signal output from the discharge detection sensor 93 from low-level to high-level, i.e. after the passage of the trailing end of the last document through the discharge detection sensor 93.

Note that the feed abnormality detector 83 may be configured to notify the end of the document reading to the user, for example, through the display of a message to the effect that the document reading has been ended on the display unit 363 if it is detected in Step S6 by the document passage detector 82 that the document has passed the reading position 413.

If the discharge of the last document being conveyed to the discharge tray 59 is detected (S7; YES), the feed abnormality detector 83 instructs the motor controller 81 to stop the drive motors for the various rollers 52, 53, 54, 56, 57 and 58, thereby ending the document feeding operation using the document feeder 5.

As just described, according to the configuration of the first embodiment, the last document is discharged to the discharge tray 59 without the conveyance thereof being stopped when the passage of the trailing end of the document through the reading position 413 is detected by the document passage detector 82 to detect the end of the reading of the last document even if the posture of the document feeder 5 is other than the closing posture during the conveyance of the last document. Thus, after the last document is discharged, another document can be immediately read and an operation of reading the next document can be efficiently performed.

Note that, in the above embodiment, the document passage detector 82 is configured to determine in Step S6 (FIG. 8) that the document has passed the reading position 413 when the pulse number of the drive signal for the motor for driving the pre-reading roller 56 reaches the predetermined pulse number after the detection signal output from the read detection sensor 92 changes from the low-level signal indicating the presence of the document to the high-level signal indicating the absence of the document.

For example, a detection sensor for detecting a document cannot be provided between the reading position 413 and the discharge tray 59 in some cases due to a reason that there is no arrangement space or another reason. Even in such cases, the document passage detector 82 can determine that the trailing end of the document has passed the reading position 413 using the read detection sensor 92 for detecting the document at the detection position upstream of the reading position 413.

However, instead of the above configuration, the document passage detector 82 may be configured to determine in Step S6 (FIG. 8) that the trailing end of the document has passed the reading position 413 when the detection signal output from the discharge detection sensor 93 changes from the low-level signal indicating the presence of the document to the high-level signal indicating the absence of the document, i.e. when the last document is discharged to the discharge tray 59.

Since the discharge detection sensor 93 is disposed downstream of the reading position 413 in this case, the document passage detector 82 can accurately determine that the trailing end of the document has passed the reading position 413 by the passage of the document through a position downstream of the reading position 413. Note that a sensor for detecting a document may be separately disposed downstream of the reading position 413, for example, between the pre-reading roller 57 and the discharge detection sensor 93 or at another position and it may be determined that the trailing end of the document has passed the reading position 413 when the passage of the document is detected by this separately disposed sensor instead of by the discharge detection sensor 93.

Further, the configurations and settings shown in FIGS. 1 to 8 in the above embodiment are merely examples and not of the nature to limit the present disclosure to this embodiment. For example, the document feeder 5 may have a simpler configuration without including the CIS 55 (FIG. 2). Further, information indicated by the high-level or the low-level of each of various signals may, for example, indicate a meaning opposite to that of the above embodiment.

Second Embodiment

Figure 9:
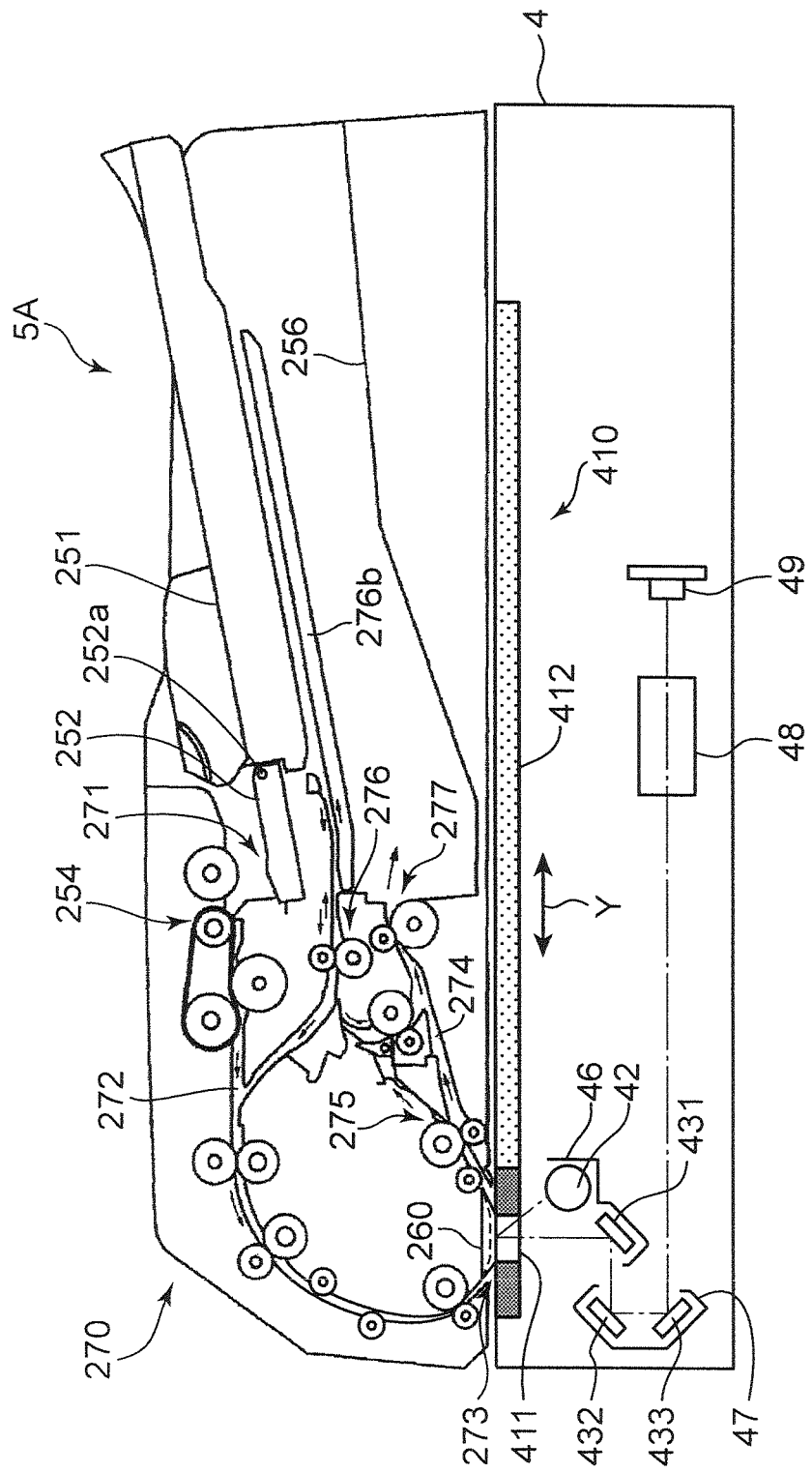
FIG. 9 is a schematic sectional view showing an upper structure according to a second embodiment of the present disclosure.
Figure 10:
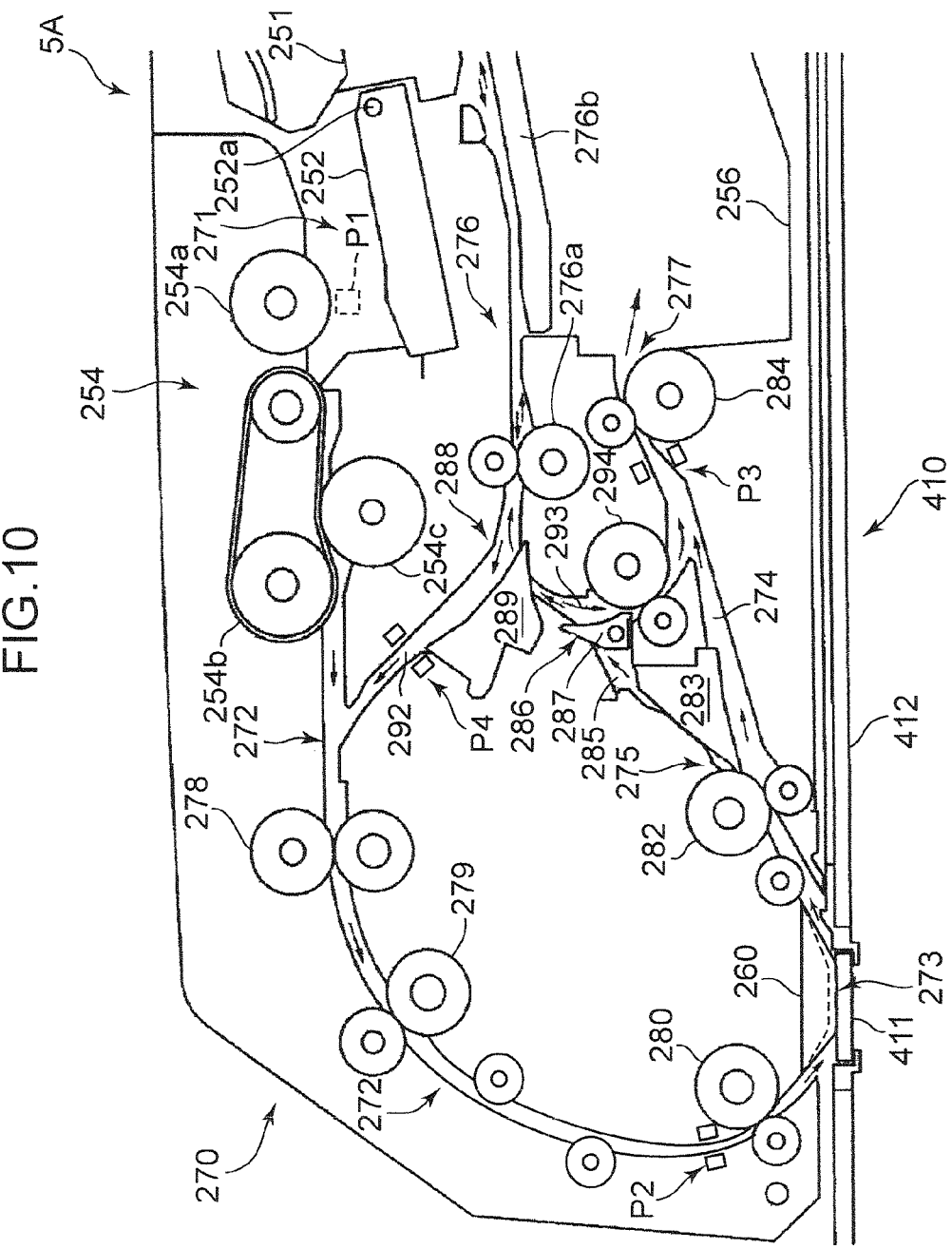
FIG. 10 is an enlarged schematic sectional view showing a part of the upper structure shown in FIG. 9 near a reading position.

Next, a second embodiment of the present disclosure is described. In the second embodiment is illustrated an example of a document conveyance control in the case of using a document feeder capable of allowing images on one and the other sides of a document to be read by reversing the document upside down. FIG. 9 is a schematic sectional view showing a document feeder 5A (upper structure) according to the second embodiment of the present disclosure and FIG. 10 is an enlarged schematic sectional view showing a part of the document feeder 5A near a reading position. Note that the document feeder 5A is assembled into a complex machine 1 similarly to the document feeder 5 described in the first embodiment. Thus, the machine configuration other than the document feeder 5A is the same as in the first embodiment and, hence, not described.

The document feeder 5A includes a document tray (placing portion) 251, a lift plate 252, a document conveying unit 270 and document discharge tray (document discharging portion) 256.

The document tray 251 is provided on an upper part of the document feeder 5A. One or more documents whose image(s) is/are to be optically read are stacked on the document tray 251. The document tray 251 is inclined downward from an upstream side toward a downstream side in a document conveying direction, i.e. from left to right in FIG. 9.

The lift plate 252 is provided downstream of the document tray 251 in the document conveying direction. The lift plate 252 is formed of a plate-like member extending along a placing surface of the document tray 251. The lift plate 252 is rotatable in a vertical plane extending along the document conveying direction about a substantially horizontal supporting shaft 252a provided on an upstream part thereof and extending in forward and backward directions (directions perpendicular to the plane of FIG. 9) of the document feeder 5A with a downstream end as a free end. The lift plate 252 is rotated about the supporting shaft 252a by an unillustrated driving mechanism in feeding documents, and downstream ends of the documents stacked on the document tray 251 are biased upward to come into contact with a pickup roller 254a arranged thereabove.

The document conveying unit 270 includes a document feed opening 271 and a feeding portion 254 at a downstream end of the document tray 251 in the document conveying direction. The feeding portion 254 separates the documents stacked on the document tray 251 one by one from the uppermost one and feeds them to the interior of the document conveying unit 270 through the document feed opening 271. A first document conveyance path 272 is provided to extend toward the interior of the document conveying unit 270 at a downstream side of the document feed opening 271.

A downstream end of the first document conveyance path 272 reaches the bottom surface of the document feeder 5A. A document reading position 273 in the ADF reading mode is set at the position of the downstream end of the first document conveyance path 272. A second document conveyance path 274 is provided downstream of the reading position 273. Further, a reading guide 260 is provided to face a document automatic reading glass 411 between the first document conveyance path 272 and the second document conveyance path 274. That is, when a document being conveyed from the first document conveyance path 272 to the second document conveyance path 274 passes the reading position 273 that is a clearance between the document automatic reading glass 411 and the reading guide 260, an image on a first surface (one side) which is a lower surface is read by an image reader 4 provided below. Note that the reading guide 260 is configured similarly to the reading guide described above based on FIG. 4 in the first embodiment.

A document switching unit 275 is provided downstream of the reading position 273 on the second document conveyance path 274. The document having the image on the first surface read at the reading position 273 and conveyed to the document switching unit 275 is conveyed upward from the second document conveyance path 274. A document reversing unit 276 for reversing the document having the image on the first surface read upside down is provided at a downstream side of the document switching unit 275 in the document conveying direction.

In the document reversing unit 276, the conveying direction of the document having the image on the first surface read is changed to an opposite direction. The document having the conveying direction changed, i.e. the document whose lower surface is the first surface is fed into the first document conveyance path 272 by way of a conveyance path above the document switching unit 275. When the document is conveyed to the reading position 273, the upper surface thereof is the first surface and an image on a second surface (other side) opposite to the first surface is read in the image reader 4. By changing the conveying direction of the document having the image on the first surface read to the opposite direction in the document reversing unit 276 in this way, the document is reversed upside down.

A document discharge opening 277 is provided downstream of the document switching unit 275 and at a downstream end of the second document conveyance path 274. The document having the images on the both sides read is discharged to the document discharge tray 256 through the document discharge opening 277. The document discharge tray 256 is provided below the document tray 251. A user can take out the document discharged to the document discharge tray 256 from the front side of the document feeder 5A.

In this way, the document conveying unit 270 is configured to feed documents placed on the document tray 251 one by one, convey them to the document reversing unit 276 via the reading position 273 and convey the documents reversed upside down by the document reversing unit 276 to the document discharge tray 256 via the reading position 273.

Next, the detailed configuration of the document conveying unit 270 is described using FIG. 10. Note that solid line arrows in FIG. 10 indicate the document conveyance path and conveying direction. As described above, the document conveying unit 270 includes the document feed opening 271 and the feeding portion 254 at the downstream end of the document tray 251 in the document conveying direction. The first document conveyance path 272 extends downward at the downstream side of the document feed opening 271.

The feeding portion 254 is provided in an upper part of a substantially central part in a document width direction perpendicular to the document conveying direction and includes the pickup roller 254a, a feed belt 254a and a separating roller 254c.

The pickup roller 254a is provided at the downstream side of the document feed opening 271. When documents stacked on the document tray 251 are lifted up by the lift plate 252 in feeding the documents, the uppermost document comes into contact with the pickup roller 254a from below. This uppermost document is transferred to the feed belt 254b by the rotation of the pickup roller 254a and conveyed to the interior of the document conveying unit 270 by the feed belt 254b.

The feed belt 254b is so arranged downstream of the pickup roller 254a that a lower part of the outer surface thereof projects into the first document conveyance path 272. The feed belt 254b is mounted on two pulleys and rotates clockwise so as to be able to convey the document leftward of FIG. 10 from the document feed opening 271.

The separating roller 254c is arranged below the feed belt 254b and in contact with the feed belt 254. The document is passed through a conveyance nip formed between these feed belt 254b and separating roller 254c. A rotational drive force of the separating roller 254c is so restricted as not to feed overlapping lower documents when a plurality of documents are inserted into the conveyance nip in an overlapping manner. That is, when a plurality of documents are inserted into the conveyance nip in an overlapping manner, only the uppermost one of the overlapping documents is fed by the feed belt 254b. This can prevent a problem of multiple feed in which documents are fed in an overlapping manner and enables the documents to be conveyed one by one.

A registration roller 278, a conveyor roller 279 and a pre-reading roller 280 are provided downstream of the feeding portion 254 on the first document conveyance path 272. The registration roller 278 forms a nip in cooperation with a roller it is facing and sends a document at an adjusted predetermined timing while correcting the oblique feed of the document by having the rotation and the stop thereof controlled. The conveyor roller 279 sandwiches the document in cooperation with a roller it is facing and conveys the document by the rotation thereof. The pre-reading roller 280 forms a nip in cooperation with a roller it is facing and conveys the document toward the reading position 273 by the rotation thereof.

A post-reading roller 282 and the document switching unit 275 are provided downstream of the reading position 273 on the second document conveyance path 274. The document switching unit 275 includes a switching guide 283 pivotable in a vertical plane about a substantially horizontal unillustrated supporting shaft extending in forward and backward directions (directions perpendicular to the plane of FIG. 10) of the document feeder 5A. The switching guide 283 extends long in forward and backward directions of the document feeder 5A, i.e. in the document width direction. The switching guide 283 is driven by an unillustrated solenoid and changes its posture to bring a leading end part on the upstream side in the document conveying direction upward and downward.

A discharge roller 284 and the document discharge opening 277 are provided downstream of the document switching unit 275 and at the downstream end of the second document conveyance path 274. The discharge roller 284 forms a nip in cooperation with a roller it is facing and discharges the document to the document discharge tray 256 through the document discharge opening 277 by the rotation thereof.

On the other hand, a third document conveyance path 285 is provided downstream of the document switching unit 275 at a position diagonally upward right from the second document conveyance path 274 extending substantially rightward in FIG. 10. A document conveyed to the document switching unit 275 after having an image on a first surface read at the reading position 273 is conveyed from an intermediate position of the second document conveyance path 274 to the document reversing unit 276 via the third document conveyance path 285 by changing the posture of the switching guide 283 of the document switching unit 275 to a downward facing posture.

A first document branching unit 286 is provided downstream of the document switching unit 275 on the third document conveyance path 285. The first document branching unit 286 is a branching point to a later-described fifth document conveyance path 293 provided at a side closer to the document discharge tray 256 than the third document conveyance path 285 and to the third document conveyance path 285. A first branching guide 287 is provided between the third and fifth document conveyance paths 285 and 293.

The first branching guide 287 extends long in the document width direction. Further, a lower part of the first branching guide 287 is supported by being coupled to a frame of the document feeder 5A by an unillustrated spring member and an upper end side thereof is pivotable about this supported part in a vertical plane extending along the document conveying direction. The first branching guide 287 is configured to close the third document conveyance path 285 with the upper end side thereof. The spring member for supporting the first branching guide 287 has such an elastic force to be curved by the contact of the document with the first branching guide 287. By this, the first branching guide 287 changes its posture to bring an upper end part to right in FIG. 10 when the document passes along the third document conveyance path 285. After the trailing end of the document passes the first branching guide 287 or when the document does not come into contact therewith, the first branching guide 287 brings the upper end part to left and is held in a posture shown in FIG. 10, i.e. in a posture to close the third document conveyance path 285.

A second document branching unit 288 is provided between a downstream end of the third document conveyance path 285 and the document reversing unit 276. The second document branching unit 288 includes a second branching guide 289. The second branching guide 289 extends long in forward and backward directions of the document feeder 5A. Further, the second branching guide 289 is driven by an unillustrated solenoid and changes its posture to bring a right end part thereof upward and downward.

The second branching guide 289 changes its posture to bring the right end part in FIG. 10 upward when the document passes the third document conveyance path 285. After the trailing end of the document passes the second branching guide 289 or when the document does not come into contact therewith, the second branching guide 289 brings the right end part downward and is held in a posture shown in FIG. 10, i.e. in a posture to close the third document conveyance path 285.

The document reversing unit 276 is provided downstream of the third document conveyance path 285 and above the second document conveyance path 274. The document reversing unit 276 includes a reversing roller 276a and a reverse tray 276b.

The reversing roller 276a is arranged at a most upstream side of the document reversing unit 276 with respect to the third document conveyance path 285 and is driven to rotate in clockwise and counterclockwise directions by an unillustrated motor. The reverse tray 276b is arranged right below the document tray 251 with a relatively narrow clearance formed therebetween, and extends obliquely upward similarly to the document tray 251 (see FIG. 9).

In the document reversing unit 276, the leading end of the document conveyed from left to right in FIG. 10 along the third document conveyance path 285 is temporarily fed to the reverse tray 276b. When the trailing end of this document approaches the reversing roller 276a, the conveying direction of the document is changed from a rightward direction to a leftward direction by reversely rotating the reversing roller 276a with the document held between the reversing roller 276a and a roller it is facing.

A fourth document conveyance path 292 is provided to the left of the document reversing unit 276 and the second document branching unit 288 and above the third document conveyance path 285. The fourth document conveyance path 292 extends leftward from the second document branching unit 288 and the left end thereof joins the first document conveyance path 272 at a position upstream of the registration roller 278. By this, the document having completely passed through the second document branching unit 288 and having the conveying direction changed in the document reversing unit 276 passes along the fourth document conveyance path 292 and is fed into the first document conveyance path 272 again. Thereafter, the document reaches the reading position 273 and an image on a second surface (other side) which is a lower surface is read.

The fifth document conveyance path 293 is provided to be branched off from the third document conveyance path 285 at the first document branching unit 286. The fifth document conveyance path 293 is branched off from the third document conveyance path 285 at the first document branching unit 286 and extends downward and joins the second document conveyance path 274. A conveyor roller 294 is provided at an intermediate position of the fifth document conveyance path 293. The conveyor roller 294 sandwiches the document in cooperation with a roller it is facing and conveys the document to a downstream side of the second document conveyance path 274 by the rotation thereof.

The document having the images on the both sides read is fed to the document reversing unit 276 again to have the conveying direction reversed. Thereafter, the second branching guide 289 changes its posture to bring the right end part upward and the document is fed into the fifth document conveyance path 293. By this, documents are discharged to the discharge tray 256 with the upper and lower sides matching with those when they are initially stacked on the document tray 251.

A document detection sensor (document detector) P1, a read detection sensor (upstream detector) P2, a discharge detection sensor (downstream detector) P3 and a reverse detection sensor P4 are provided in the document feeder 5A.

The document detection sensor P1 is a sensor for detecting whether or not there is any document placed on the document tray 251 and disposed below and near the pickup roller 254a. The document detection sensor P1 is configured by a light transmission type sensor including a light emitting element and a light receiving element on opposite side surfaces (opposite side surfaces perpendicular to the plane of FIG. 10) in the document feeder 5A. When documents placed on the document tray 251 are lifted up by the lift plate 252 and the uppermost document is in contact with the pickup roller 254a, the document detection sensor P1 outputs a low-level detection signal indicating the presence of the documents from the light receiving element since light emitted from the light emitting element is blocked by the documents. On the other hand, when no document is placed on the document tray 251, light emitted from the light emitting element is received by the light receiving element. Thus, a high-level detection signal indicating the absence of the document is output from the light receiving element.

The read detection sensor P2 is disposed at a position (detection position) upstream of and near the pre-reading roller 280 on the first document conveyance path 272 and detects the presence of the document at this position. The read detection sensor P2 is configured by a photointerrupter in which a light emitter and a light receiver are facing each other with the first document conveyance path 272 therebetween. The read detection sensor P2 outputs a high-level detection signal while light emitted from the light emitter toward the light receiver is not blocked and outputs a low-level detection signal while light emitted from the light emitter toward the light receiver is blocked by the document being conveyed. That is, the detection signal output from the read detection sensor P2 is switched from high-level to low-level when the leading end of the document is conveyed to the read detection sensor P2, and switched from low-level to high-level when the trailing end of the document passes the read detection sensor P2 thereafter.

The discharge detection sensor P3 is disposed at a position (detection position) upstream of and near the discharge roller 284 on the second document conveyance path 274, and detects the presence of the document at this position. The discharge detection sensor P3 is configured by a photointerrupter in which a light emitter and a light receiver are facing each other with the second document conveyance path 274 therebetween. The discharge detection sensor P3 outputs a high-level detection signal while light emitted from the light emitter toward the light receiver is not blocked and outputs a low-level detection signal while light emitted from the light emitter toward the light receiver is blocked by the document being discharged. That is, the detection signal output from the discharge detection sensor P3 is switched from high-level to low-level when the leading end of the document is conveyed to the discharge detection sensor P3, and switched from low-level to high-level when the trailing end of the document passes the discharge detection sensor P3 thereafter.

The reverse detection sensor P4 is disposed at a position (detection position) downstream of the second document branching unit 288 and downstream of and near the second branching guide 289 on the fourth document conveyance path 292 and detects the presence of the document at this position. The reverse detection sensor P4 is configured by a photointerrupter in which a light emitter and a light receiver are facing each other with the fourth document conveyance path 292 therebetween. The reverse detection sensor P4 outputs a high-level detection signal while light emitted from the light emitter toward the light receiver is not blocked and outputs a low-level detection signal while light emitted from the light emitter toward the light receiver is blocked by the document conveyed by way of the second document branching unit 288 after the conveying direction is changed in the document reversing unit 276. That is, the detection signal output from the reverse detection sensor P4 is switched from high-level to low-level when the leading end of the document is conveyed to the reverse detection sensor P4, and switched from low-level to high-level when the trailing end of the document passes the reverse detection sensor P4 thereafter.

Figure 11:
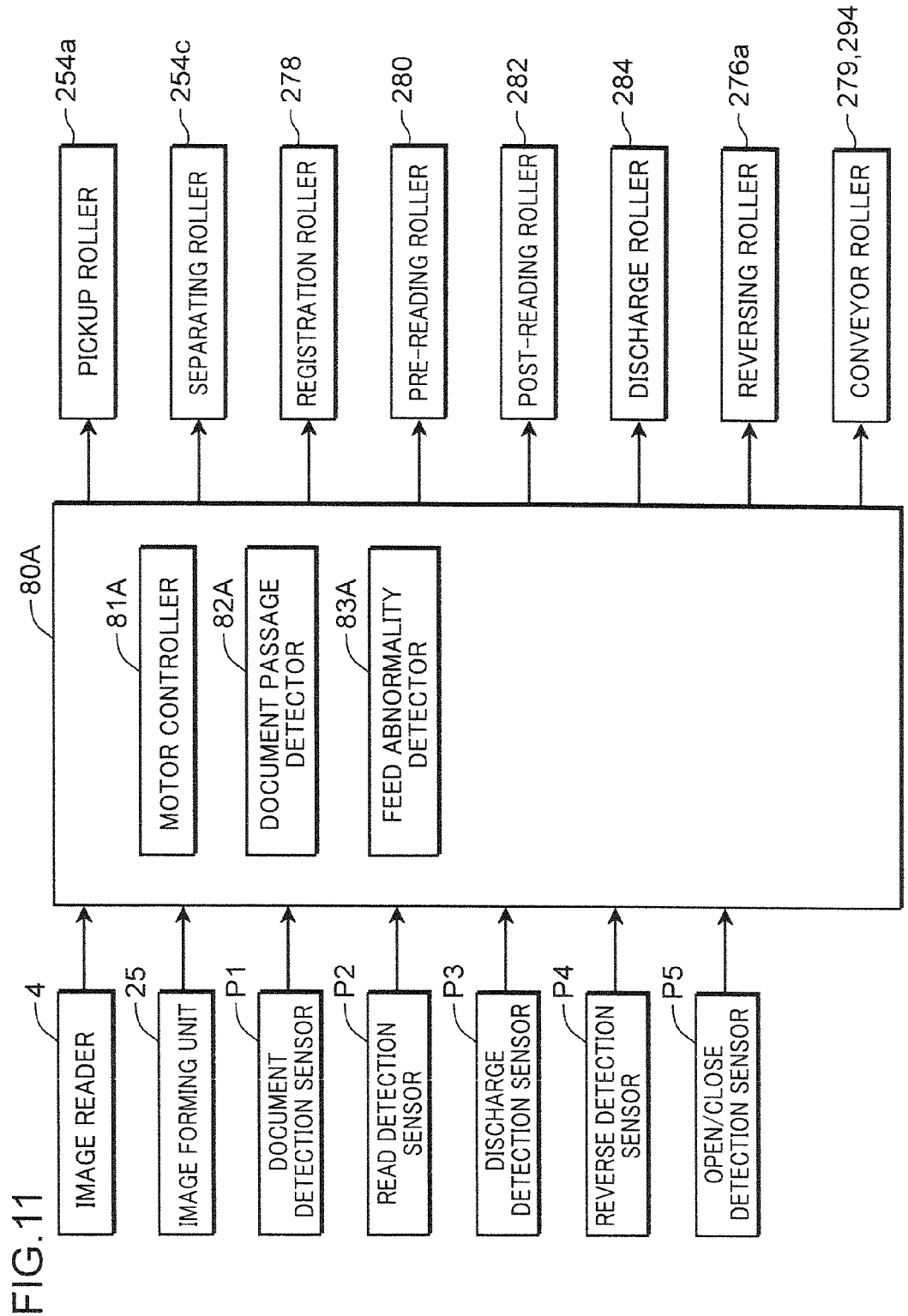
FIG. 11 is a block diagram showing an electrical configuration of a complex machine according to the second embodiment.

Next, an electrical configuration of the complex machine according to the second embodiment is described. FIG. 11 is a block diagram showing the electrical configuration of the complex machine according to the second embodiment. This complex machine includes a controller 80A responsible for an operation control of each unit of the complex machine. The controller 80A is, for example, configured by a microcomputer including a CPU and memories such as a ROM and a RAM and controls the operation of each unit by executing various control programs stored in the memory by the CPU.

The controller 80A is connected to be capable of mutual communication with the image reader 4, an image forming unit 25 (see first embodiment), the aforementioned various detection sensors P1 to P4, an open/close detection sensor P5 (posture detector) and drivers for the pickup roller 254a, the separating roller 254c, the registration roller 278, the pre-reading roller 280, the post-reading roller 282, the discharge roller 284, the reversing roller 276a and the conveyor rollers 279, 294. Note that the open/close detection sensor P5 is a sensor corresponding to the open/close detection sensor 67 described based on FIGS. 5 and 6 in the first embodiment.

Note that, in the following description, the pickup roller 254a, the separating roller 254c, the registration roller 278, the pre-reading roller 280, the post-reading roller 282, the discharge roller 284, the reversing roller 276a and the conveyor rollers 279, 294 are collectively written as "various rollers" for the sake of convenience.

The controller 80A controls a document feeding operation of the document feeder 5A by executing a control program, which functions as a motor controller 81A, a document passage detector 82A and a feed abnormality detector (controller) 83A, by the CPU.

The motor controller 81A outputs drive signals to unillustrated respective motors for driving and rotating the various rollers about their shafts, and controls to drive and rotate the various rollers at speeds predetermined therefor. Note that each motor is, for example, configured by a stepping motor and driven and rotated by a predetermined angle according to the pulse number of the drive signal.

The document passage detector 82A detects that the trailing end of a document being conveyed via the various rollers has passed the reading position 273. Specifically, the document passage detector 82A determines that the document has passed the reading position 273 when the pulse number of the drive signal for the motor for driving the pre-reading roller 280 reaches a predetermined pulse number after a detection signal output from the read detection sensor P2 changes from a low-level signal indicating the presence of the document to a high-level signal indicating the absence of the document.

Note that the predetermined pulse number is determined based on an experimental value of a test operation or the like. For example, a document is conveyed a distance from a position where the read detection sensor P2 is arranged (detection position) to the reading position 273 and a pulse number equal to or larger than the pulse number of the drive signal required for the rotation of the motor for driving the pre-reading roller 280 at this time is determined as the predetermined pulse number.

The feed abnormality detector 83A controls to stop the driving rotation of the various rollers and stop the conveyance of the document when the placement of the document on the document tray 251 is detected by the document detection sensor P1 and the closing posture of the document feeder 5A is not detected by the open/close detection sensor P5 during the conveyance of the document.

Further, the feed abnormality detector 83A controls to stop the driving rotation of the various rollers and stop the conveyance of the document when it is not detected by the document passage detector 82A that the trailing end of the document reversed upside down by the document reversing unit 276 has passed the reading position 273 if it is detected by the document detection sensor P1 that no document is placed on the document tray 51 and the closing posture of the document feeder 5A is not detected by the open/close detection sensor P5 during the conveyance of the document.

On the other hand, the feed abnormality detector 83A causes the document being conveyed to be discharged to the discharge tray 256 without stopping the driving rotation of the various rollers when it is detected by the document passage detector 82A that the trailing end of the document has passed the reading position 273 if it is detected by the document detection sensor P1 that no document is placed on the document tray 251 and the closing posture of the document feeder 5A is not detected by the open/close detection sensor P5 during the conveyance of the document.

Figure 12:
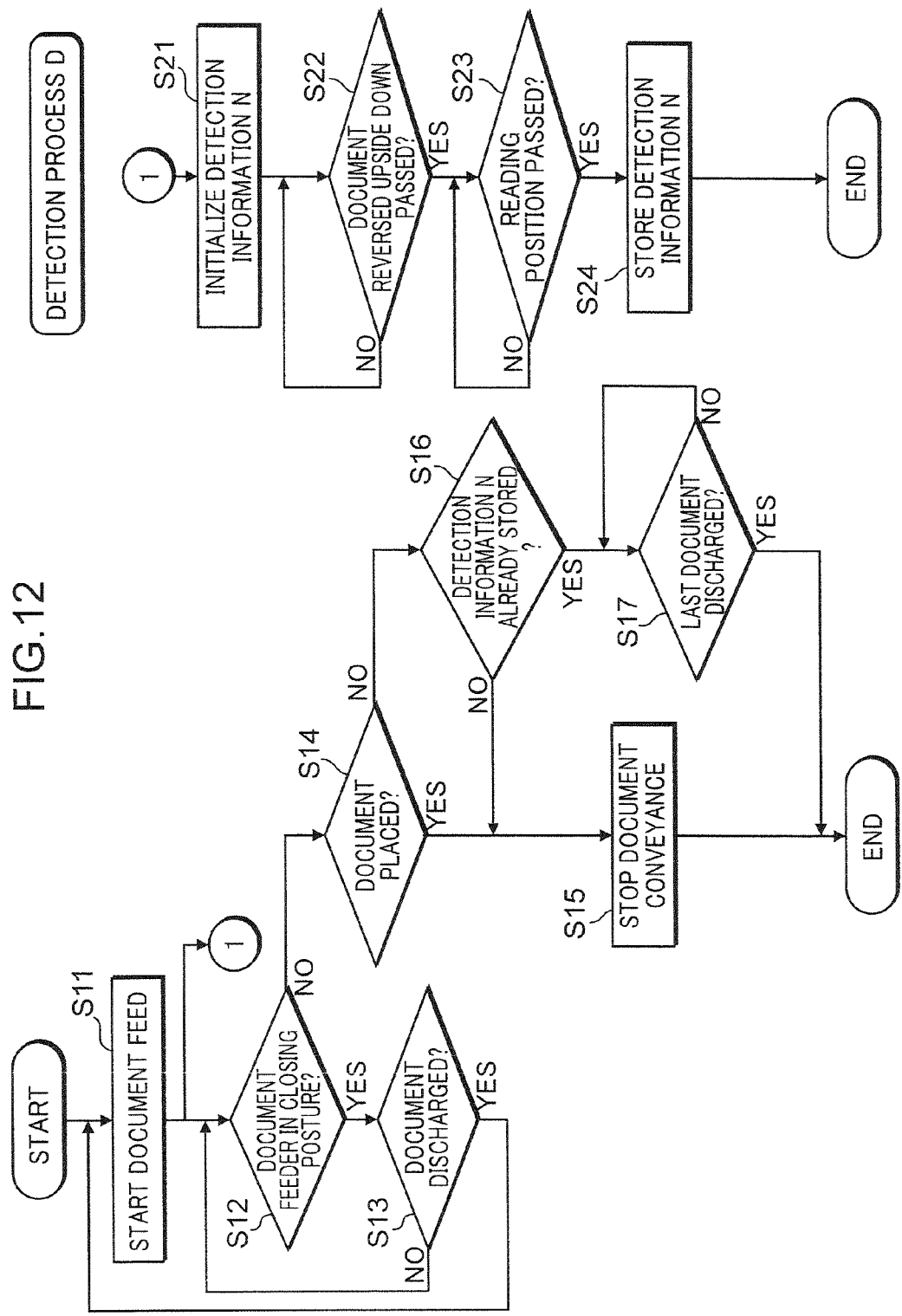
FIG. 12 is a flow chart showing an example of a document feeding operation of the upper structure according to the second embodiment.

The flow of the document feeding operation using the document feeder 5A is described below using a flow chart of FIG. 12.

When an operation of reading both sides of documents in the ADF reading mode is started by the controller 80A, for example, based on a copy function execution instruction input from an operation unit 36 (FIG. 1), the motor controller 81A starts the drive of the drive motors for the various rollers and starts the feed of the uppermost document of a stack of the documents placed on the document tray 251 (S11).

After the execution of Step S11, the feed abnormality detector 83A starts a detection process on the passage of the reversed document through the reading position (hereinafter, referred to as a "detection process D") in parallel to a process in Step S12 and subsequent Steps to be described later.

When starting the detection process D, the feed abnormality detector 83A deletes detection information on the passage of the reversed document through the reading position (hereinafter, referred to as "detection information N") to be described later (initialization) if this information is stored in the RAM (S21). Then, it is waited until the passage of the document whose feed was started in Step 11 is detected by the reverse detection sensor P4 (S22; NO). On the other hand, if the passage of this document is detected by the reverse detection sensor P4 (S22; YES), the feed abnormality detector 83A waits until it is detected by the document passage detector 82A that the document has passed the reading position 273, i.e. until it is detected by the document passage detector 82A that the document has passed the reading position 273 after being reversed upside down by the document reversing unit 276 (S23; NO).

If it is detected by the document passage detector 82A that the document whose feed was started in Step S11 has passed the reading position 273 after being reversed upside down by the document reversing unit 276 (S23; YES), the feed abnormality detector 83A stores the detection information N in the RAM (S24). This detection information N is information indicating that the document whose feed was started in Step S11 has passed the reading position 273 after being reversed upside down by the document reversing unit 276.

On the other hand, if a low-level detection signal indicating that the document feeder 5A is in the closing posture is output from the open/close detection sensor P5 during the conveyance of the document by the various rollers after the execution of Step S11 (S12; YES), the feed abnormality detector 83A continues the conveyance of the document by the various rollers until the discharge of the document being conveyed to the discharge tray 256 is detected by the switch of a detection signal output from the discharge detection sensor P3 from low-level to high-level, i.e. the passage of the trailing end of the document through the discharge detection sensor P3 (S13; NO). If the document being conveyed is discharged to the discharge tray 256 (S13; YES), a return is made to Step S11 and the feed of the next document, i.e. the uppermost document on the document tray 251 is started.

On the other hand, if a high-level detection signal indicating that the document feeder 5A is in the opening posture is output from the open/close detection sensor P5 during the conveyance of the document (S12; NO), the feed abnormality detector 83A causes the document detection sensor P1 to detect whether or not there is any document on the document tray 251 (S14).

If there is/are any document(s) on the document tray 251 and the low-level detection signal indicating the presence of the document is detected by the document detection sensor P1, i.e. the document that is not the last document is being conveyed (S14; YES), the feed abnormality detector 83A instructs the motor controller 81A to stop the drive motors for the various rollers, thereby stopping the conveyance of the document (S15). Note that the feed abnormality detector 83A may be configured to notify a reason, why the conveyance of the document has been stopped, to the user, for example, through the display of a message to the effect that the document feeder 5A was opened during the conveyance of the document on the display unit 363 in accordance with the execution of Step S15.

Further, the feed abnormality detector 83A also executes Step S15 if there is no document on the document tray 251 and the high-level detection signal indicating the absence of the document is output by the document detection sensor P1, i.e. the last document is being conveyed (S14; NO) and if the detection information N is not stored in the RAM by the detection process D, i.e. the passage of the last document reversed upside down through the reading position 273 is not detected yet by the document passage detector 82A (S16; NO).

Note that the feed abnormality detector 83A may be configured to execute Step S15 and notify a need to re-read the last document to the user, for example, through the display of a message to the effect that the last document needs to be re-read due to the opening of the document feeder 5A during the reading of the last document on the display unit 363 if the detection information N is not stored in the RAM by the detection process D, i.e. the passage of the last document reversed upside down through the reading position 273 is not detected yet by the document passage detector 82A in Step S16.

On the other hand, the conveyance of the last document is continued if the high-level detection signal indicating the absence of the document is output by the document detection sensor P1, i.e. the last document is being conveyed (S14; NO) and if the detection information N is stored in the RAM by the detection process D, i.e. the passage of the last document reversed upside down through the reading position 273 is already detected by the document passage detector 82A (S16; YES). Specifically, in this case, the feed abnormality detector 83A causes the various rollers to continue the conveyance of the document until the last document being conveyed passes the discharge roller 284 and the discharge thereof to the discharge tray 256 is detected (S17; NO) after the elapse of a predetermined time after the switch of the detection signal output from the discharge detection sensor P3 from low-level to high-level, i.e. after the passage of the trailing end of the last document through the discharge detection sensor P3.

Note that the feed abnormality detector 83A may be configured to notify the end of the document reading to the user, for example, through the display of a message to the effect that the document reading has been ended on the display unit 363 if the detection information N is stored in the RAM by the detection process D, i.e. the passage of the last document reversed upside down through the reading position 273 is already detected by the document passage detector 82A in Step S16.

If the discharge of the last document being conveyed to the discharge tray 256 is detected (S17; YES), the feed abnormality detector 83A instructs the motor controller 81A to stop the drive motors for the various rollers, thereby ending the document feeding operation using the document feeder 5A.

As just described, according to the second embodiment, the last document is discharged to the discharge tray 256 without the conveyance thereof being stopped when the passage of the trailing end of the document through the reading position 273 is detected by the document passage detector 82A to detect the end of the reading of the both sides of the last document even if the posture of the document feeder 5A is other than the closing posture during the conveyance of the last document. Thus, after the last document is discharged, another document can be immediately read and an operation of reading the next document can be efficiently performed.

According to the present disclosure described above, it is possible to provide an image forming apparatus which includes an apparatus main body and an upper structure which can be set in a closing posture for covering the upper surface of the apparatus main body and an opening posture for exposing the upper surface and is capable of efficiently performing an operation of reading a document.

Note that although the complex machine has been described as an example of the image forming apparatus according to the present disclosure in the above embodiments, the present disclosure is also applicable to an image forming apparatus such as a printer, a copier, a scanner or a FAX.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An image forming apparatus, comprising:
an apparatus main body which has an upper surface and includes:
a reader for reading an image of a document at a predetermined reading position on the upper surface, and
an image forming unit for forming an image on a sheet based on an image read by the reader;
an upper structure which can be set in a closing posture for covering the upper surface of the apparatus main body and an opening posture for exposing the upper surface and includes:
a placing portion on which the document is to be placed,
a document discharging portion to which the document having an image read by the reader is to be discharged,
a document conveying unit which feeds documents placed on the placing portion one by one and conveying the documents to the document discharging portion via the reading position, and
a document detector for detecting whether or not any document is placed on the placing portion;
a posture detector for detecting the posture of the upper structure;
a document passage detector for detecting that the trailing end of the document conveyed by the document conveying unit has passed the reading position; and
a control unit for controlling a document conveying operation, wherein the control unit:
stops the conveyance of the document by the document conveying unit if the placement of the document on the placing portion is detected by the document detector, the document is being conveyed by the document conveying unit and the closing posture is not detected by the posture detector; and
stops the conveyance of the document by the document conveying unit when it is not detected by the document passage detector that the trailing end of the document being conveyed has passed the reading position and, on the other hand, causes the document being conveyed to be discharged to the document discharging portion without stopping the conveyance of the document by the document conveying unit when it is detected by the document passage detector that the trailing end of the document being conveyed has passed the reading position if it is detected by the document detector that no document is placed on the placing portion, the document is being conveyed by the document conveying unit and the closing posture is not detected by the posture detector.

2. An image forming apparatus according to claim 1, wherein:
the upper structure further includes an upstream detector which detects the document at a detection position provided upstream of the reading position in a conveyance path for the document by the document conveying unit and outputs a signal indicating the presence or absence of the document; and
the document passage detector determines that the trailing end of the document has passed the reading position when the document is conveyed by the document conveying unit a set distance set in advance as a distance equal to or longer than a distance from the detection position to the reading position after the signal changes from the one indicating the presence of the document to the one indicating the absence of the document.

3. An image forming apparatus according to claim 1, wherein:
the upper structure further includes a downstream detector which detects the document at a detection position provided downstream of the reading position in a conveyance path for the document by the document conveying unit and outputs a signal indicating the presence or absence of the document; and
the document passage detector determines that the trailing end of the document has passed the reading position when the signal changes from the one indicating the presence of the document to the one indicating the absence of the document.

4. An image forming apparatus according to claim 1, further comprising a document reversing unit for reversing a document having an image read by the reader upside down; wherein:
the document conveying unit conveys the document to the document reversing unit via the reading position and further conveys the document reversed upside down by the document reversing unit to the document discharging portion via the reading position in the case of reading images on both sides of the document; and
the control unit stops the conveyance of the document by the document conveying unit when it is not detected by the document passage detector that the trailing end of the document after being reversed upside down by the document reversing unit has passed the reading position and, on the other hand, causes the document being conveyed to be discharged to the document discharging portion without stopping the conveyance of the document by the document conveying unit when it is detected by the document passage detector that the trailing end of the document after being reversed upside down by the document reversing unit has passed the reading position if it is detected by the document detector that no document is placed on the placing portion, the document is being conveyed by the document conveying unit and the closing posture is not detected by the posture detector.

* * * * *